United States Patent [19]

Laging

[11] 4,194,389
[45] Mar. 25, 1980

[54] APPARATUS FOR PRESSURE TESTING PIPE

[76] Inventor: Jerry D. Laging, Apartado 88, Anaco, Venezuela

[21] Appl. No.: 888,238

[22] Filed: Mar. 20, 1978

[51] Int. Cl.² ............................................. G01M 3/28
[52] U.S. Cl. ........................................ 73/46; 73/49.1; 73/49.5
[58] Field of Search ................. 73/40.5 R, 46, 49.1, 73/49.5, 49.6, 49.8

[56] References Cited

U.S. PATENT DOCUMENTS

| | | | |
|---|---|---|---|
| 2,761,311 | 9/1956 | Baker | 73/46 |
| 3,371,521 | 3/1968 | Hauk | 73/46 |
| 3,921,437 | 11/1975 | Hauk | 73/40.5 R |
| 3,975,945 | 8/1976 | Hauk et al. | 73/46 |
| 4,010,633 | 3/1977 | Hasha | 73/46 |
| 4,132,111 | 1/1979 | Hasha | 73/46 |

*Primary Examiner*—John Petrakes
*Attorney, Agent, or Firm*—Marvin B. Eickenroht; Jennings B. Thompson

[57] ABSTRACT

External pipe testing apparatus is disclosed as comprising semi-cylindrical housing sections hingedly connected for swinging between an open position to permit the housing to be moved into and out of a position about a section of the pipe to be tested. When the pipe sections are locked to one another, seal strips mounted on the inside of each housing section are caused to sealably engage with one another and the ends of the pipe section to form an annular test chamber about the pipe section.

22 Claims, 6 Drawing Figures

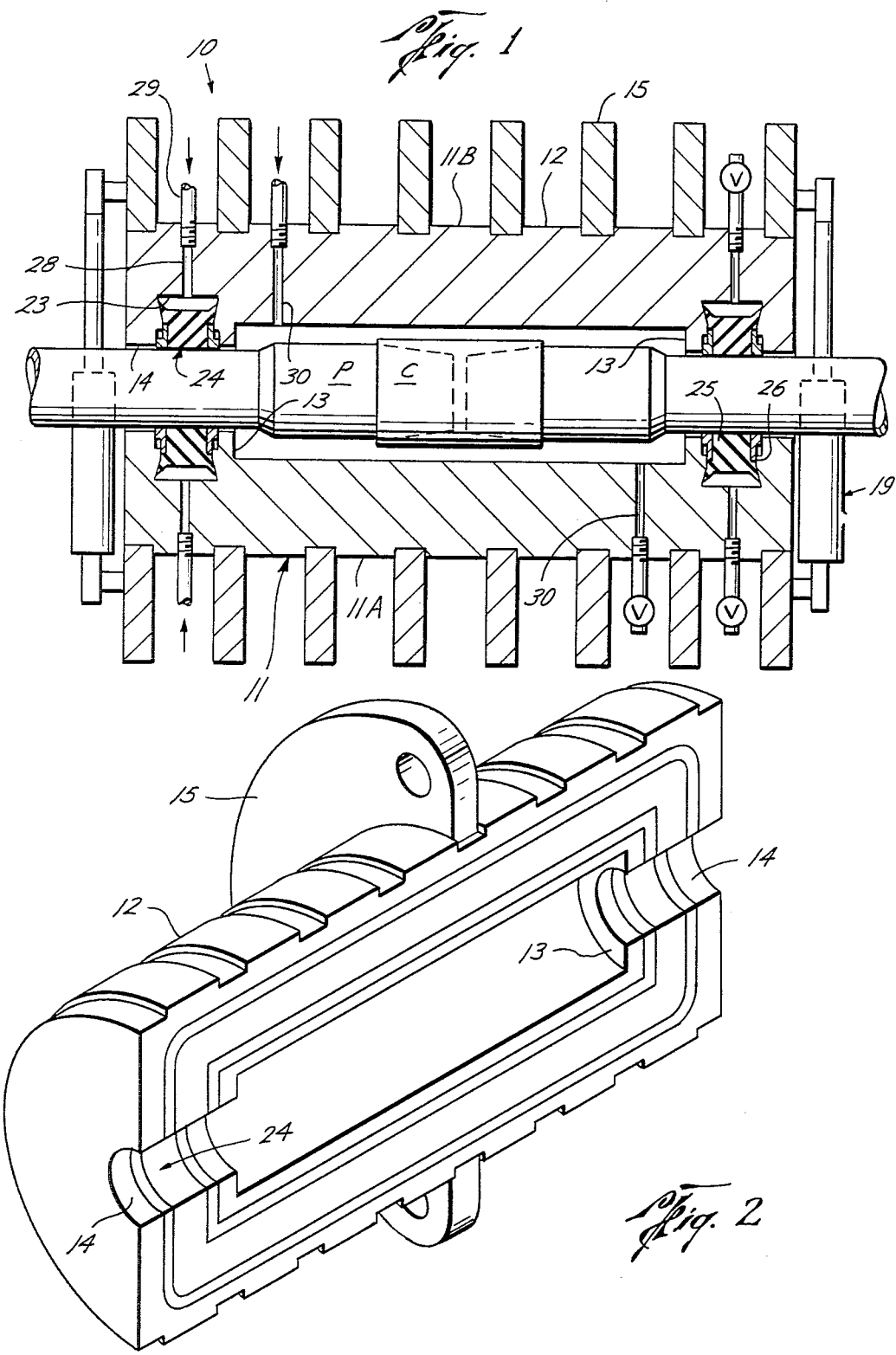

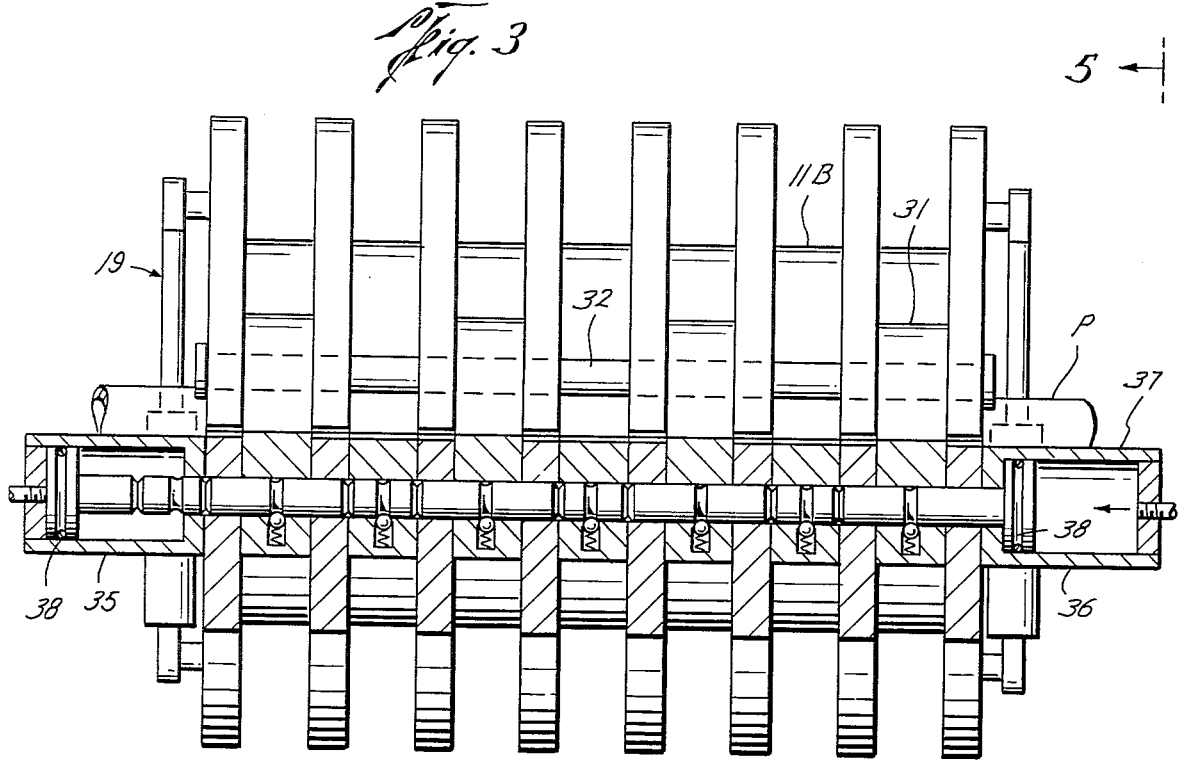
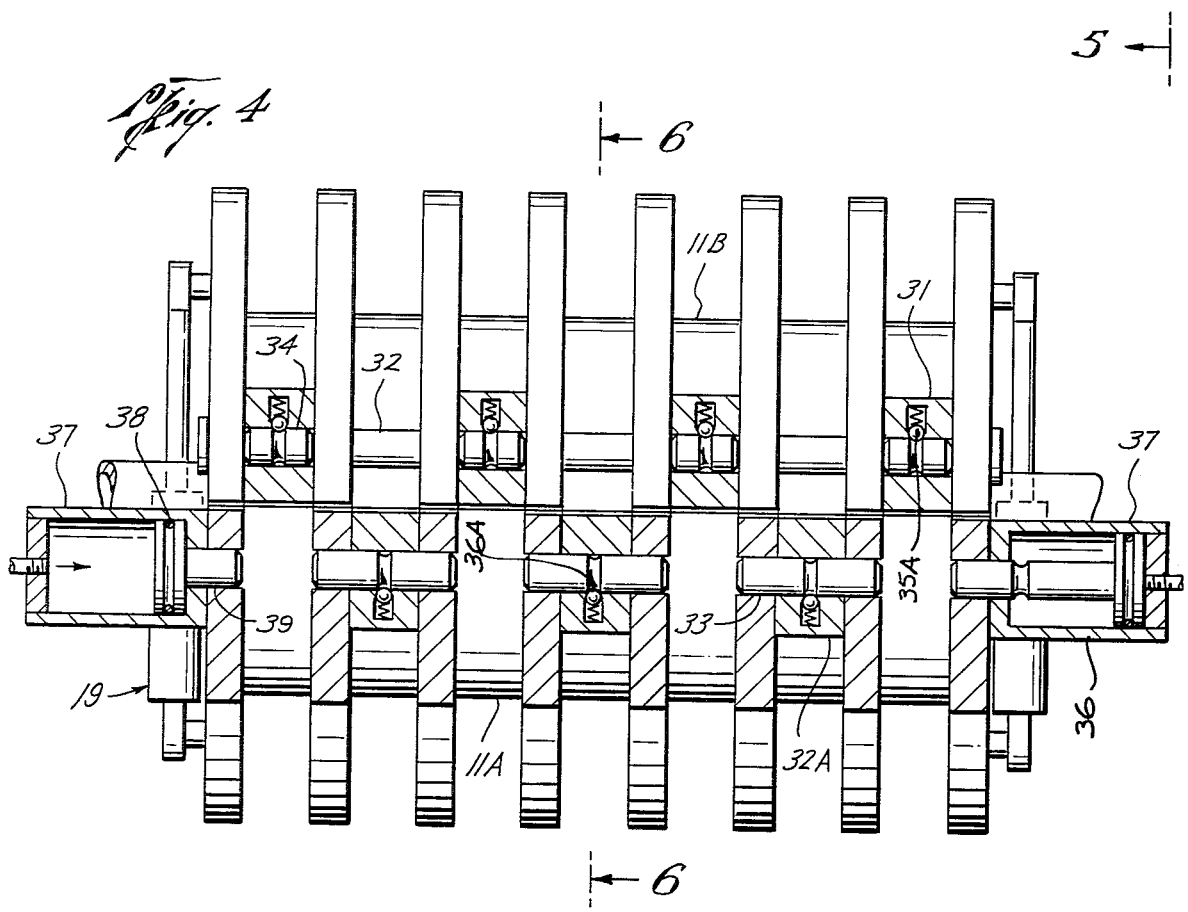

APPARATUS FOR PRESSURE TESTING PIPE

This invention relates to apparatus for pressure testing pipe; and, more particularly, improved pipe testing equipment of the external type wherein test fluid under pressure is introduced into a sealed, annular space about a section of the pipe to be tested, usually a threaded joint, to determined the ability of the joint or other portions of the pipe section to hold the test pressure.

Testing apparatus of this latter type is shown, for example, in U.S. Pat. No. 3,371,521, assigned to Hauk Industries, Inc., of Long Beach, Calif. As illustrated therein, it comprises an outer metal housing made up of generally semi-cylindrical sections each having an outer arcuate side wall and end walls having recesses formed therein for disposal about opposite ends of the pipe to be tested, whereby such sections may be assembled about the pipe sections with their side and end walls in edge-to-edge relation. More particularly, a packer which is of substantially cylindrical shape for fitting within the housing also has end walls with recesses formed therein in general alignment with the recesses in the outer metal body for fitting tightly about the ends of the pipe sections when the body sections are so assembled. One pair of edges of the side walls of the outer housing sections are hinged to one another, and the packer is split along one side in a plane generally aligned with the free edges of the metal body opposite the hinged edges, so that the entire apparatus may be moved laterally onto and off of the section of pipe to be tested.

The recesses in the end walls of the packer are so sized as to fit tightly about and seal with the ends of the pipe section as the housing is assembled and locked about the pipe. More particularly, the split edges of the packer will be brought into sealing engagement with one another so as to form an annular test space or chamber about the pipe section. Holes are provided through the outer housing and the packer to permit test fluid under pressure to be admitted to and exhausted from the annular test space, so that the operator is able to determine if there is leakage in the pipe section.

Each outer housing section is provided with arcuate, axially spaced reinforcing ribs about it, so that the test pressures may be held within the annular body without having to form it of excessive thickness. In the aforementioned U.S. Pat. No. 3,371,521, the outer housing sections are hinged to one another by means of pins which extend through holes in adjacent ends of the reinforcing ribs and links which extend between them. Latches for use in locking the housing about the pipe cooperate with pins which extend through holes in the free ends of the ribs of the outer housing sections.

U.S. Pat. No. 3,975,945 shows similar apparatus having body sections which are locked in edge-to-edge relation by rods which extend through axially aligned holes in the edges of the ribs of one body section and in links which bridge the separation between the ribs on each section. Upon removal of one of these rods, the housing sections may be swung between open and closed positions. In the apparatus shown in U.S. Pat. No. 3,975,945, a fluid-actuated operator is installed on one end of the housing for use in moving the connecting rod between locking and unlocking positions.

The external pipe testing apparatus illustrated in the above-mentioned patents contemplates that it may be used in testing pipes of somewhat different diameter. This, of course, makes it necessary for the recesses in the end walls of the outer housing to be oversized. As a result, the end walls of the packer must be reinforced with metal parts in some way so as to prevent the packer from extruding through the space between the recesses in the end walls of the outer body and the end of the pipe section to be tested. Furthermore, metal parts of different sizes must be used, depending on the size of the pipe to be tested. This, together with the complicated shapes to which the packers must be molded, makes apparatus of this type difficult and expensive to manufacture. Still further, if the housing sections are pinned together, as in U.S. Pat. No. 3,975,945, the actuator must extend from one end of the housing for a distance approximating its height. In many cases, especially when testing occurs on the rig floor of a well, there is insufficient head room to accommodate the actuator.

In another type of external pipe testing apparatus, the outer metal housing comprises a solid cylindrical body which is moved over the end of the pipe string for disposal about the section thereof to be tested. The inside of the metal housing carries sealing elements near its upper and lower ends which are urged into sealing engagement with the pipe string above and below the section to be tested. Preferably, the sealing elements are so urged by fluid from the same source which is normally available on the job site for use as a test fluid. Thus, ports are provided in the housing to admit the test pressure to the annular space formed about the section to be tested after the sealing elements have been moved into sealing engagement with the pipe. Obviously, the necessity for moving the housing of this latter type of apparatus over the end of the pipe string is time-consuming.

The primary object of the present invention is to provide external pipe testing apparatus which is of much simpler construction than the type illustrated in the above-mentioned patents, but which, at the same time, is much simpler to use than the last-described type of testing apparatus, in that, similarly to the first-described type, it may be moved laterally onto or off of the pipe section to be tested.

Another object is to provide external pipe testing apparatus wherein hingedly connected outer housing sections are locked about the pipe by means of rod segments which are so arranged and constructed with respect to aligned holes in the ends of ribs on one housing section and a link bridging the gap between adjacent rib ends that the segments need only be moved a relatively short distance between locking and unlocking positions.

These and other objects are accomplished, in accordance with the illustrated embodiment of the invention, by external pipe testing apparatus which is similar to that shown in the aforementioned U.S. Pat. No. 3,371,521 in that it comprises a hollow housing including a plurality, and preferably a pair of hemispherically shaped, sections, each having a curved side wall and end walls at opposite ends of the side wall, with the inner edge of each end wall having a recess for disposal about the pipe at one end of the section to be tested when the housing sections are assembled about the section of pipe to be tested in end-to-end relation. However, as compared with the apparatus of such patent, each housing section has a continuous groove formed in the edges of its ends and side walls, and a seal strip is carried within each such groove for sealably engaging a corresponding seal strip of the groove of an adjacent section and for sealably engaging about the pipe at both ends of the section to be tested. In this manner, when the housing sections are locked in edge-to-edge relation about the pipe, test fluid may be admitted to the annular chamber formed by the seal strips so as to test the section of the pipe therein.

Preferably, each seal strip is sealably slidable inwardly and outwardly within the groove, and a means is provided for admitting and exhausting actuating fluid to and from each groove behind the seal strip. It is further preferred that each seal strip include a strip of rubber-like material having a retainer plate on opposite sides and adjacent the outer end thereof the sliding into and out of sealing engagement with the end of the pipe section.

As compared with the apparatus of the above-mentioned patent, the apparatus of the present invention is adapted to fit essentially only one size of pipe. Thus, the recesses formed in the end walls of the outer housing are so formed as to fit closely about the pipe, and thus to provide backup for the seal strips. On the other hand, and as compared with the other previously described external pipe testing apparatus of this type, the housing need not be moved longitudinally over the end of the pipe string, but rather may be moved laterally into and out of position about such pipe section. More particularly, and as in the aforementioned patent, a means is provided for hingedly connecting the housing sections to one another, except along one pair of adjacent side edges, and a means is provided for releasably locking the free edges of the housing sections in closed position.

As is also true of the testing apparatus of the aformentioned patents, the side walls of each arcuate housing section have axially spaced reinforcing ribs about its outer side, and such housing sections are hinged together by means of pins extending through holes in adjacent ends of the ribs and links extending across the separation between them. More particularly, the opposite free edges of the reinforcing rings are releasably locked to one another by means of locking parts on the ribs of one housing section which project from the edge thereof for fitting within slots between adjacent ribs at the edge of the other section, when the sections are in edge-to-edge relation, and holes through the locking parts are axially aligned with holes through the ribs of the other section when the locking parts are so fitted. As distinguished from the locking mechanism of the aforementioned patents, however, the housing sections of the present invention are releasably locked to one another by means of first and second sets of rod segments which are axially slidable within the aligned holes, with the first set of rod segments being of lengths which are substantially equal to that of the holes through the locking parts, and the second set of rod segments being of lengths which are substantially equal to the distance between adjacent slots of the other section. Consequently, the rod segments may be shifted between locking position in which the second sets of rod segments extend through the locking parts and adjacent ribs on opposite sides of the slot in which the locking parts are received, and an unlocking position in which the second set of segments extend through the holes in the ribs on each side of adjacent slots, and the first set of segments extend through holes in the locking parts. Consequently, it is necessary to shift the rod segments only a short distance between their first and second positions, so that neither the rod segments nor power operators for so moving them need extend a substantial distance beyond the ends of the housing. Preferably, the means for so shifting the rod segments includes a fluid-operated actuator on each end of the housing engageable with opposite ends of the rod segments.

In the preferred embodiment of the invention, as in the apparatus of the previously mentioned patents, the locking parts comprise links which are pivotally connected to the reinforcing ribs of one section. Also, the other housing section includes spacers between the ribs on opposite sides of each slot, with the spacers having holes therethrough forming continuations of the holes through the ribs. Means are also provided for holding the rod segments in their unlocking positions, and thus keep them from sliding axially into a position in which they would interfere with the return of the housing sections to locking position. Preferably, the holding means also serves to hold the rod segments in their locked positions so that they will remain in locking position even though power might be removed from the operators.

In the drawings, wherein like reference characters are used throughout to designate like parts:

FIG. 1 is a vertical sectional view of apparatus constructed in accordance with the present invention, as seen along broken lines 1—1 of FIG. 5, and showing the seal strips moved into sealing engagement with opposite ends of a threaded pipe section about which the housing is disposed;

FIG. 2 is a perspective view of one of the housing sections, as seen from the inner side thereof, and with all but one of the reinforcing rings removed for purposes of clarity;

FIG. 3 is a vertical sectional view of the apparatus as seen along broken line 3—3 of FIG. 5, and showing the rod segments thereof in locking position;

FIG. 4 is a view similar to FIG. 3, but as seen along broken lines 4—4 of FIG. 6, and with the rod segments shifted to an unlocking position;

Figure 6:
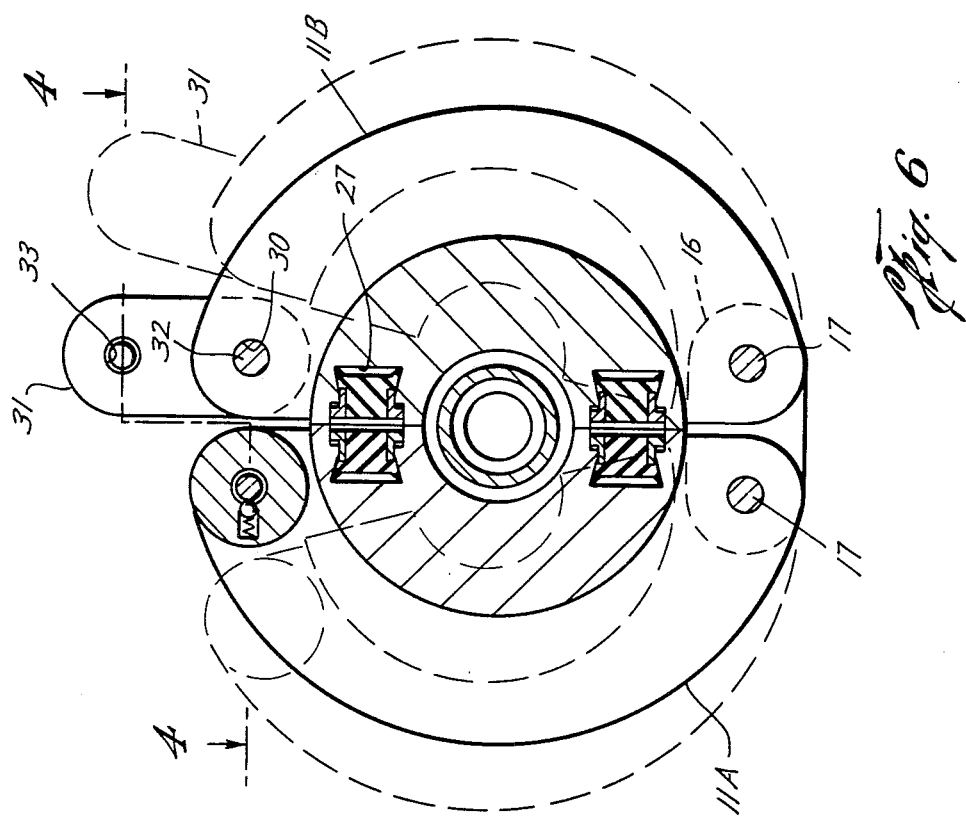
FIG. 6 is a cross-sectional view of the apparatus, as seen along broken lines 6—6 of FIG. 4, and showing in phantom lines the position of the housing sections when swung to open position to permit movement of the housing laterally onto and off of the section of pipe to be tested.

With reference to the above-described drawings, the overall apparatus, which is indicated in its entirety by reference character 10, comprises a hollow housing 11 including generally semi-cylindrical sections 11A and 11B. Each housing section includes a curved side wall 12 and end walls 13 at opposite ends of the side wall, with the inner side of the curved side wall having a radius larger than that of the pipe section P to be tested, and the inner edge of each end wall having a recess 14 adapted to fit closely about the ends of pipe section P. As shown in the drawings, pipe section P includes the ends of threaded pipe joints connected by a coupling C, so that ordinarily the operator of the apparatus 10 is seeking to detect leakage in one or both of the threaded joints between the pipe ends and the coupling.

Each section of the outer housing also includes arcuate ribs 15 extending about the outer side of the curved side wall 12 in axially spaced-apart relation. More particularly, the inner edge of each such rib is received within a shallow arcuate groove about the outer side of each housing section and is fixed thereto in any suitable fashion, as by welding. As will also be apparent from the drawings, the ribs extend about substantially the entire outer diameter of each side wall, and are horizontally aligned with corresponding ribs secured about the outer side of the other housing section. Thus, when the housing sections are assembled about the pipe section P, as shown in FIGS. 3 and 4, for example, the opposite ends of each rib will be generally adjacent the opposite ends of the rib of the other body section.

The housing sections are hingedly connected together in edge-to-edge relation along one longitudinal side of the housing by means of links 16, which are connected to one another across the separation between the housing sections. Thus, the links are provided with holes therethrough aligned with holes in the ribs near their adjacent edges to receive pins 17 therethrough to provide the hinge which permits swinging of the housing sections between a closed position about the pipe section P and an open position, as shown in phantom lines in FIG. 6, to permit the apparatus to be moved laterally onto or off of the pipe section P.

Figure 5:
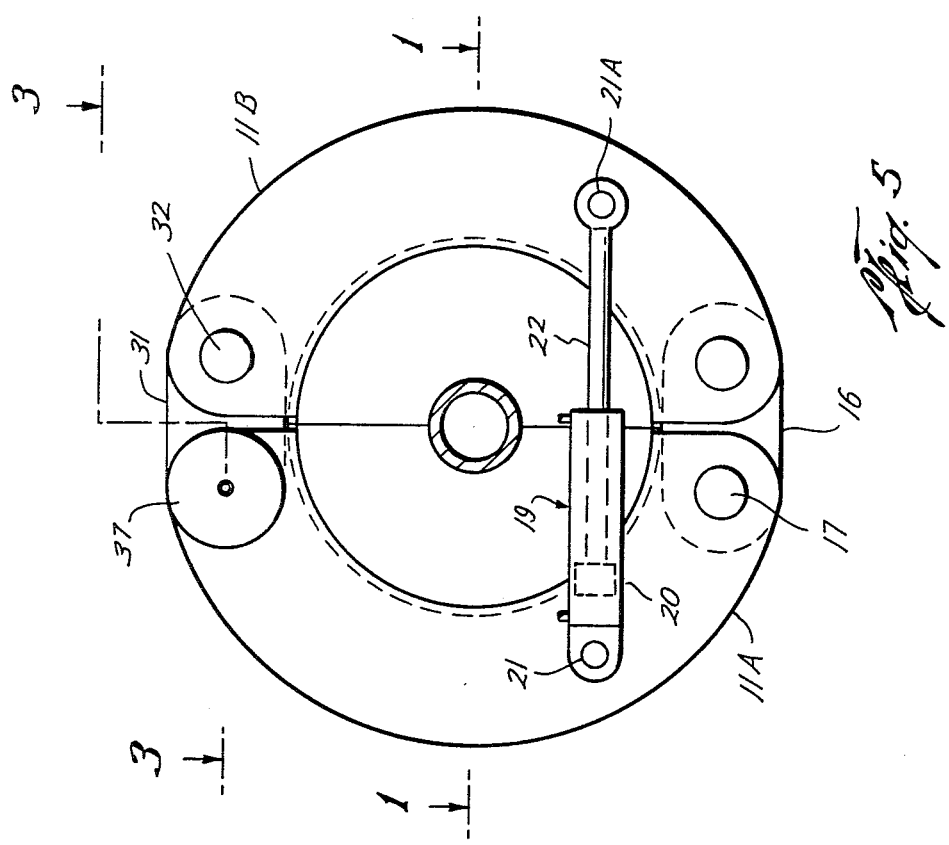
FIG. 5 is an end view of the apparatus, as shown along broken lines 5—5 of FIG. 3.

A fluid-actuated operator 19 is connected to opposite ends of the housing sections to facilitate their movement between opened and closed positions. Thus, as best shown in FIG. 5, each operator includes a cylinder 20 hingedly connected to a rib of housing section 11A by means of pin 21, and a rod 22 having a piston sealably reciprocalbe within the cylinder and pivotally connected at its free ends to a rib of housing section 11B by means of a pin 21A. Although the opposite ends of the actuator are shown to be pivotally connected to the reinforcing ribs of the housing, one or both of them may instead be connected to the end wall of the housing. In any event, suitable fluid connections are made with opposite ends of the cylinder for alternately introducing and exhausting operating fluid to and from the opposite sides of the piston 20 so as to move the housing sections to their closed position when the actuator is retracted, as shown in FIG. 5, and move them to open position when the actuator is expanded.

Each housing section has a continuous groove 23 formed in the edges of its end and side walls, and a seal strip 24 is carried within each groove for engaging the corresponding seal strip in the groove of the other housing section, as shown in FIG. 6, and for engaging about the pipe, as best shown in FIG. 1. Thus, the seal strips are adapted to form a test chamber about the pipe section P. Preferably, the seal strip is molded as a unitary piece for fitting closely within the groove 23, so that it is not necessary, in sealing between the seal strips of the housing sections and about the ends of the pipe section, to also seal between separated sections of the seal strip itself.

Each seal strip includes a strip 25 of rubber or rubber-like material having a retainer plate 26 on opposite sides thereof and adjacent the outer end of the seal strip. More particularly, the seal strip 24 is slidable within its groove between a retracted position in which its inner ends are generally flush with the edges of the housing section in which it is carried, and thus with its inner end spaced a slight distance from the inner end of the seal strip carried by the other housing section as well as a slight distance from the pipe section about which it is to be sealed, and an extended position in which the inner face of the seal strip is urged into tight sealing engagement with the corresponding seal strip of the other housing section and about opposite ends of the pipe section, as shown in FIG. 1.

Each seal strip is of a size such that, when relaxed, it will assume the outer position shown in FIG. 6—i.e., out of sealing engagement with the corresponding seal strip of the other housing section and the pipe. More particularly, the thickness of the seal strip is less than the depth of the groove 23 so that, when the seal strip is disposed in its outer position, a space 27 is formed between its outer end and the bottom of the groove 23. Test fluid under pressure is introduced into the outer end of the groove through passageway 28 to which a conduit 29 is connected to move the seal strip from its retracted to its extended position.

The retainer plates 26 are carried inwardly with the strip of rubber 25 so that their inner ends are forced into engagement with the pipe and with corresponding retainer plates of the seal strip of the other housing section. These retainer plates thus insure against extrusion of rubber from strip 25 between the small spaces between the ends of the pipe section and the housing recesses 14 as well as the small spaces between the oppositely facing edges of the housing sections themselves. Preferably, the retainer plates have radially enlarged inner ends which slide within enlarged portions of the inner end of each groove. As the seal strip is retracted to its outer, non-sealing position, these enlarged ends of the retainer plates slide within the enlarged ends of the groove until engaging the end of the enlarged width of the groove, and thus in effect provide a stop to prevent the seal strip from moving outwardly beyond the position shown in FIG. 6. Also, the inner ends of the seal strips are flared outwardly to fit tightly in the flared bottom of the groove. During insertion of the seal strip, the rubber is sufficiently deformable to permit it to be flattened somewhat as the seal strip is inserted into place.

With the housing locked about the pipe section P, and the seal strips moved into sealing position, as shown in FIG. 1, the pipe section may be tested by test fluid admitted to the annular test space under desired pressure. For this purpose, passageways 30 are formed in the side wall of one of the housing sections for receiving test fluid from a suitable source. This test pressure may be held for the length of time necessary to test the pipe section, after which test pressure may be relieved and test fluid in the annular space exhausted back to its source. Following exhaustion of test pressure from within the annular space, operating fluid behind the seal strips may be exhausted to permit the seal strips to move outwardly to non-sealing positions.

As shown, there are preferably two passageways 30, one in each housing section, for admitting test fluid to the test chamber at its opposite ends and at diametrically opposed locations. Similarly, there may be two pairs of passageways 28 through which operating fluid for the seal strips may be introduced into the groove 23.

As in the case of their hingedly connected ends, the ends of reinforcing ribs 15 adjacent the free edges of the housing sections are provided with holes 30 therein. Also, links 31 are connected to the free ends of the ribs on housing section 11B by a pin 32 extending through holes 30 therein and aligned holes in the link to permit the link to be pivoted between the position of FIG. 6 and a position in which the links fit within slots formed between adjacent ribs. In this latter position, the links are releasably locked to the adjacent ribs of housing section 11B by means of rod segments (to be described) which, as will be described, extend axially within aligned holes 33 in the free ends of the links and holes 30 in the ends of the ribs of housing section 11A between the links are fitted.

More particularly, and as best shown in FIGS. 3 and 4, links 31 are pivotally mounted between only alternate paris of reinforcing ribs of housing section 11B for fitting within slots opposite thereto which are formed between corresponding alternate pairs of ribs on housing section 11A. However, fillers or spacers 32A are disposed between and connected to the ends of the other alternate pairs of ribs on housing section 11A—i.e., those which are not laterally opposite a link. Each such spacer also has a hole therein aligned with holes 30 in the free ends of the ribs on housing 11A, so that the aforementioned rod segments may extend through them, as will be desceibed to follow.

Thus, since the reinforcing ribs are horizontally aligned with one another as well as equally spaced apart along the length of the housing, the links, slots and spacers are of equal thickness. In like fashion, each link and the ribs between which it is disposed and each spacer and the ribs between which it is disposed are of equal axial extent. When the links are swung into the slots at the free ends of the ribs of housing 11A, they may be locked to or unlocked from such housing by means of rod segments which are axially shiftable within the aligned holes in the ribs, the outer ends of the links and the spacers. Thus, there are two sets of rod segments 33 and 34, the longer set 33 being of an axial length substantially equal to that of the aligned holes in the free ends of the links and the ribs formed in the slot in which they are received, and the shorter set 34 being of an axial length substantially equal to the slot and thus to the length of the holes in the links 31.

In the unlocking position of FIG. 4, the longer rod segments 33 extend through the holes in the spacers and the ribs on each side thereof, while the shorter rod segments 34 are disposed entirely within the links. When, however, the links are swung to their locking positions, so that the rod segments 34 are axially aligned with the opposite ends of the rod segments 33, all rod segments may be shifted axially or longitudinally to the position of FIG. 3, which moves the short segments 34 into the holes within the spacers 32A and the long segments 33 into holes through the links and the reinforcing ribs of housing section 11A on opposite sides of the ribs. Thus, as will be understood from FIG. 3, the long segments 33 serve to bridge between the links and the reinforcing ribs of housing section 11A so as to effectively lock the housing sections to one another. Moreover, this shifting is accomplished with a minimum of vertical movement, thereby minimizing the additional height required over and above the height required to accommodate the housing itself. Thus, as shown from a comparison of FIGS. 3 and 4, the rod segments need only be shifted a distance equal to the thickness of one rib and a link or spacer.

In the illustrated embodiment of this invention, this shifting is accomplished by means of fluid-actuated operators 35 and 36 mounted on the outermost ribs of housing section 11A in general alignment with the holes in the ribs thereof. Thus, each operator includes a cylinder 37 having a piston 38 sealably slidable therein, with the piston of the actuator on one end having a relatively short rod 39 extending therefrom, and the piston 38 of the actuator on the opposite end having a relatively long rod 40 thereon. When the rod segments are in their unlocking position of FIG. 4, the piston with the shorter rod 39 is extended to dispose the end of the rod 39 in the hole in the endmost reinforcing rib, while the piston of the other actuator is retracted to dispose the end of its relatively long rod 40 through the hole in the endmost rib at the other end of the housing section.

In order to shift the rod segments to locking position, the piston with the long rod 40 is extended and the piston with the short rod is retracted. Thus, the long piston 40 will move the train of rod segments from the position of FIG. 4 to the locking position of FIG. 3. Alternatively, when it is desired to unlock the apparatus, the short rod 39 of the piston of the other actuator is again extended and the piston with the long rod 40 again retracted in order to move the train of rod segments from the position of FIG. 3 to the position of FIG. 4. Ordinarily, the actuators need be of one-way variety—i.e., movable solely in response to the introduction and exhaust of pressure fluid to and from the outer side of its piston 38.

It is desirable to provide a positive means for holding the rod segments in proper position, especially when they are in unlocked position. Otherwise, for example, the short segments 34 could be moved to positions partially or wholly out of the hole in the link in which it is carried, or the longer rod segments 33 may move partially or wholly out of the spacers and ribs in which they are carried. It's also desirable that such means positively hold the rod segments in their proper positions when in the locking position of FIG. 3, so that they will not fall or move longitudinally out of such position should power be lost in the actuator.

In the illustrated embodiment of the invention, this locking means comprises ball detents 35A and 36A carried by the links and spacers, respectively, and spring-pressed into grooves formed midway of the opposite ends of each of the rod segments. It will be understood that since the rod segments are shifted between locking and unlocking position a distance equal to the thickness of one rib and one link or spacer, each rod segment, with the exception of the rod segment 34 disposable in end-to-end relation with the short piston rod 39, will be moved from releasable engagement with one ball detent to releasable engagement with another ball detent. That is, in the unlocking position of the links shown in FIG. 4, the short segments 34 are releasably held within the holes in the links by means of ball detents 35 carried by the links themselves. At the same time, the long rod segments 33 are held by ball detents 36 carried by the spacers 32A. However, when the rod segments are shifted to the locking position of FIG. 3, all but the one short segment 34 will be releasably held by the ball detents 36A carried by spacers 32A, while the longer rod segments 33 will be held by the ball detents 35 of the links 31.

As above-mentioned, the short rod segment 34 at one end of the body will be moved partially into the cylinder of one of the actuators, as shown in FIG. 3. At the same time, the end of the longer rod 40 of the other actuator will be moved through the hole in the link at the other end of the train and into the hole in the rib next adjacent the endmost rib, as also shown in FIG. 3. When the long piston rod 40 has been moved to this latter position, it will be releasably held therein by means of a ball detent 35A spring-pressed into a groove formed about the rod 40.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in pressure testing a section of pipe, comprising a hollow housing including arcuate sections each having a curved side wall and end walls at opposite ends of the side wall, the inner edge of each end wall having a recess to fit closely about the pipe at one end of the section to be tested when adjacent housing sections are disposed about the pipe section in edge-to-edge relation, means for releasably locking the housing sections in edge-to-edge relation when so disposed, each housing section having a continuous groove formed in the edges of the ends and side walls thereof, a seal strip carried within each groove for engaging a corresponding seal strip in the groove of an adjacent section and for engaging about the pipe at each end of the section to be tested so as to sealably enclose a test chamber about said pipe section, and means for admitting and exhausting test fluid to and from said test chamber.

2. Apparatus of the character defined in claim 1, wherein each seal strip is sealably slidable inwardly and outwardly within the groove, and means are provided for admitting and exhausting actuating fluid to and from each groove behind the seal strip.

3. Apparatus of the character defined in claim 2, wherein each seal strip includes a strip of rubber-like material having a retainer plate on opposite sides and adjacent the outer end thereof for sliding inwardly and outwardly therewith.

4. Apparatus of the character defined in claim 1, including means hingedly connecting the housing sections to one another except at one pair of adjacent edges, so that they may be swung between closed position about the pipe sections and an open position to receive said pipe section between the one pair of adjacent edges, and means for releasably locking said one pair to one another when said housing sections are in closed position.

5. Apparatus of the character defined in claim 1, wherein there are a pair of housing sections.

6. Apparatus for use in pressure testing a section of pipe, comprising a hollow housing including arcuate sections each having a curved side wall and end walls at opposite ends of the side wall, the inner edge of each end wall having a recess to fit closely about the pipe at one end of the section to be tested, means hingedly connecting the housing sections to one another except at one pair of adjacent edges, so that they may be swung between a closed position about the pipe in which they are disposed in edge-to-edge relation, and an open position to receive said pipe section between said one pair of adjacent edges, and means on the housing sections for sealably enclosing a test chamber about the pipe, means for admitting and exhausting test fluid to and from the test chamber, the side wall of each arcuate housing section having axially spaced reinforcing ribs about the outer side thereof, and means for releasably locking said one pair of adjacent edges to one another including locking parts on the ribs of one housing section which project from the edge thereon for fitting within slots between adjacent ribs at the edge of the other section, when the sections are in edge-to-edge relation, holes through the locking parts and through the ribs of the other section which are axially aligned with one another when said locking parts are so fitted, and first and second sets of rod segments axially slidable within the aligned holes and being of lengths which are substantially equal to that of the holes through the locking parts and the distance between adjacent slots in said other section, respectively, so that said segments may be shifted axially between a locking position in which said second set of rod segments extend through said locking parts and ribs on said other housing section on opposite sides of the slot in which said locking parts are received, and an unlocking position in which said second set of segments extend through holes in ribs on each side of the slots and the first segments are disposed within the holes in the locking parts.

7. Apparatus of the character defined in claim 6, wherein the locking parts comprise links pivotally connected to the reinforcing ribs of the one section.

8. Apparatus of the character defined in claim 6, including means on said locking parts and on said other section for releasably holding said rod segments in their unlocking position.

9. Apparatus of the character defined in claim 8, wherein said holding means also serves to hold said rod segments in their locking position.

10. Apparatus of the character defined in claim 6, wherein said other section includes spacers disposed between ribs on opposite sides of each slot and having holes therethrough forming continuations of the holes through said ribs.

11. Apparatus of the character defined in claim 10, including means on said locking parts and on said spacers for releasably holding said rod segments in their unlocking position.

12. Apparatus of the character defined in claim 11, wherein said holding means also serves to hold said rod segments in their locking position.

13. Apparatus of the character defined in claim 6, including means for shifting said rod segments between their first and second positions.

14. Apparatus of the character defined in claim 13, wherein said shifting means includes a fluid-operated actuator engageable with the opposite ends of the rod segments.

15. Apparatus comprising a hollow housing including arcuate sections each having a curved side wall and end walls at opposite ends of the side wall, the inner edge of each end wall having a recess to fit closely about a pipe, means hingedly connecting the housing sections to one another except at one pair of adjacent edges, so that they may be swung between a closed position about the pipe in which they are disposed in edge-to-edge relation, and an open position to receive said pipe section between said one paid of adjacent edges, and means for releasably locking said one pair of adjacent edges to one another, including locking parts carried by one housing section and projecting from the edge thereof for fitting within axially spaced slots formed in the another housing section adjacent the edge thereof when the sections are in edge-to-edge relation, holes through the locking parts, holes in the other housing section extending between adjacent slots, said holes in the other housing section being axially aligned with the holes in the locking parts when said locking parts are fitted within said slots, and first and second sets of rod segments axially slidable within the aligned holes and being of lengths which are substantially equal to that of the holes through the locking parts and in said other housing section, respectively, so that said segments may be shifted axially between a locking position in which said second set of rod segments extend through said locking parts and the portion of said other housing section on opposite sides of the slot in which said locking parts are received, and an unlocking position in which said second set of segments extend through holes in portions of said other housing section on each side of the slots and the first segments are disposed within the holes in the locking parts.

16. Apparatus of the character defined in claim 15, wherein the locking parts comprise links pivotally connected to the one section.

17. Apparatus of the character defined in claim 15, including means on said locking parts and on said other section for releasably holding said rod segments in their unlocking position.

18. Apparatus of the character defined in claim 17, wherein said holding means also serves to hold said rod segments in their locking position.

19. Apparatus of the character defined in claim 15, including means on said locking parts and on said one housing section for releasably holding said rod segments in their unlocking position.

20. Apparatus of the character defined in claim 19, wherein said holding means also serves to hold said rod segments in their locking position.

21. Apparatus of the character defined in claim 15, including means for shifting said rod segments between their first and second positions.

22. Apparatus of the character defined in claim 21, wherein said shifting means includes a fluid-operated actuator engageable with the opposite ends of the rod segments.

* * * * *